(12) United States Patent
Hong et al.

(10) Patent No.: US 8,003,007 B2
(45) Date of Patent: Aug. 23, 2011

(54) LIQUID CRYSTAL COMPOSITION AND LIQUID CRYSTAL DISPLAY USING THE SAME

(75) Inventors: Sung-Hwan Hong, Suwon-si (KR); Jeong-Uk Heo, Sungnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 143 days.

(21) Appl. No.: 12/388,962

(22) Filed: Feb. 19, 2009

(65) Prior Publication Data
US 2009/0262295 A1 Oct. 22, 2009

(30) Foreign Application Priority Data
Mar. 3, 2008 (KR) .................... 10-2008-0019700

(51) Int. Cl.
*C09K 19/12* (2006.01)
*C09K 19/06* (2006.01)
*C09K 19/52* (2006.01)
*C09K 19/02* (2006.01)
*C09K 19/00* (2006.01)

(52) U.S. Cl. ........... 252/299.66; 252/299.01; 252/299.6; 428/1.1; 428/1.2; 349/1; 349/56; 349/167; 349/182; 430/20

(58) Field of Classification Search ............. 252/299.01, 252/299.6, 299.66; 430/20; 428/1.1, 1.2; 349/167, 182, 1, 56
See application file for complete search history.

(56) References Cited

U.S. PATENT DOCUMENTS
2007/0176146 A1 8/2007 Hirschmann et al.
2009/0141206 A1* 6/2009 Suh et al. .................... 349/42

FOREIGN PATENT DOCUMENTS
JP 2007248699 9/2007
KR 1020060083643 7/2006

* cited by examiner

*Primary Examiner* — Geraldina Visconti
(74) *Attorney, Agent, or Firm* — H.C. Park & Associates, PLC

(57) ABSTRACT

A twisted nematic (TN) mode liquid crystal display is provided. The liquid crystal display includes first and second display panels facing each other to create an electric field therebetween, and a liquid crystal layer disposed between the first and second display panels. The liquid crystal layer contains liquid crystal molecules having positive dielectric anisotropy, and the liquid crystal layer has a structure in which long axes of the liquid crystal molecules are aligned spirally from the first display panel to the second display panel when no electric field is created in the liquid crystal layer. The liquid crystal molecules have a dielectric anisotropy ($\Delta\in$) in a range of 4.5 to 5.7, a splay elastic constant (K11) of 14 pN or less, and a bend elastic constant (K33) of 12 pN or greater.

18 Claims, 3 Drawing Sheets

LIQUID CRYSTAL COMPOSITION AND LIQUID CRYSTAL DISPLAY USING THE SAME

CROSS-REFERENCE TO RELATED APPLICATION

This application claims priority from and the benefit of Korean Patent Application No. 10-2008-0019700, filed on Mar. 3, 2008, which is hereby incorporated by reference for all purposes as if fully set forth herein.

BACKGROUND OF THE INVENTION

1. Field of the Invention

The present invention relates to a liquid crystal composition and a liquid crystal display including the same, and more particularly, to a twisted nematic (TN) mode liquid crystal composition and a liquid crystal display including the same.

2. Discussion of the Background

A liquid crystal display (LCD) is one of the most widely used flat panel displays. Generally, an LCD includes two display panels on which field generating electrodes are formed and a liquid crystal layer disposed between the two display panels. A voltage is applied to the field generating electrodes to generate an electric field in the liquid crystal layer to determine the alignment of liquid crystal molecules in the liquid crystal layer and to adjust the transmittance of light passing through the liquid crystal layer.

Because LCDs are being fabricated to have a large area, the demand for liquid crystal displays having a wide viewing angle, an enhanced contrast ratio, and a high response speed has increased.

In order to ensure a high response speed, various physical properties of liquid crystal molecules, such as the rotational viscosity or the elastic modulus, may be adjusted, which may undesirably reduce the viewing angle and the contrast ratio.

LCDs may be classified as various types according to the direction of liquid crystal molecules in a liquid crystal layer. These types include a twisted nematic (TN) mode LCD, an in-plane switching (IPS) mode LCD, and a vertically aligned (VA) mode LCD.

SUMMARY OF THE INVENTION

The present invention provides a liquid crystal display that may have a wide viewing angle, an enhanced contrast ratio, and a high response speed.

The present invention also provides a liquid crystal composition that may provide for a wide viewing angle, an enhanced contrast ratio, and a high response speed.

Additional features of the invention will be set forth in the description which follows, and in part will be apparent from the description, or may be learned by practice of the invention.

The present invention discloses a liquid crystal display including first and second display panels facing each other to create an electric field therebetween, and a liquid crystal layer disposed between the first and second display panels and containing liquid crystal molecules having positive dielectric anisotropy. The liquid crystal layer has a structure in which long axes of the liquid crystal molecules are aligned spirally from the first display panel to the second display panel when no electric field is created in the liquid crystal layer, and the liquid crystal molecules have a dielectric anisotropy ($\Delta\varepsilon$) in a range of 4.5 to 5.7, a splay elastic constant (K11) of 14 pN or less, and a bend elastic constant (K33) of 12 pN or greater.

The present invention also discloses a liquid crystal composition including a first polar compound represented by chemical formula (II):

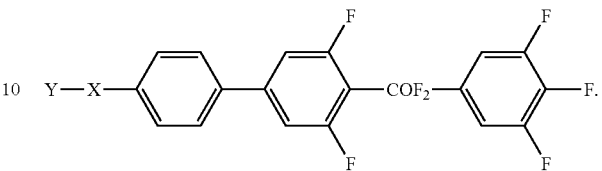

(II)

X is

and Y is an alkane, cycloalkane, or hydrogen. The liquid crystal composition also contains liquid crystal molecules having a dielectric anisotropy ($\Delta\varepsilon$) in a range of 4.5 to 5.7, a splay elastic constant (K11) of 14 pN or less, and a bend elastic constant (K33) of 12 pN or greater.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
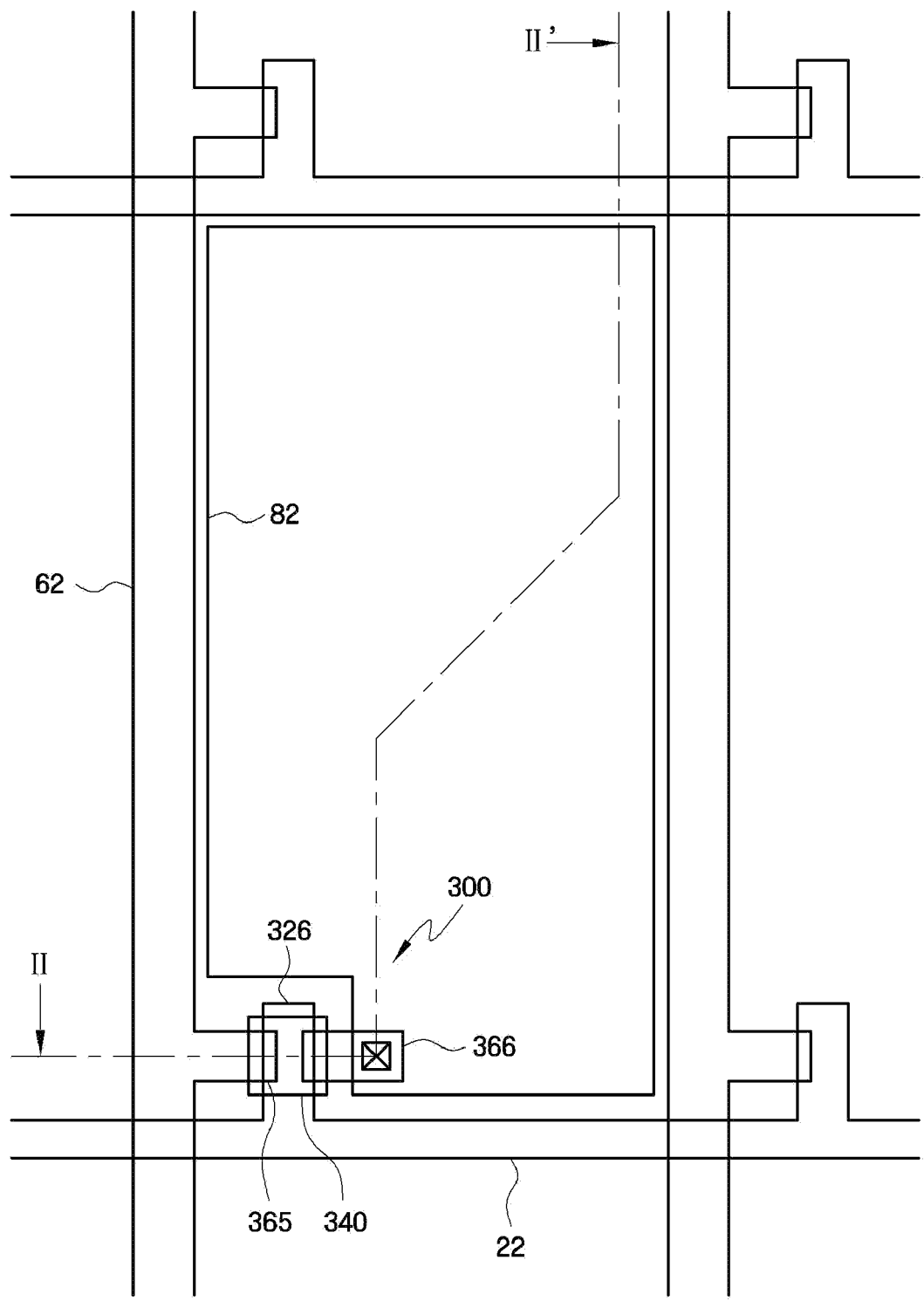
FIG. 1 is a layout diagram of a liquid crystal display according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

A liquid crystal composition according to an exemplary embodiment of the present invention will now be explained with reference to FIG. 1 and FIG. 2. FIG. 1 is a layout diagram of a liquid crystal display according to an exemplary embodiment of the present invention, and FIG. 2 is a sectional view of the liquid crystal display of FIG. 1 taken along line II-II' of FIG. 1.

Figure 2:
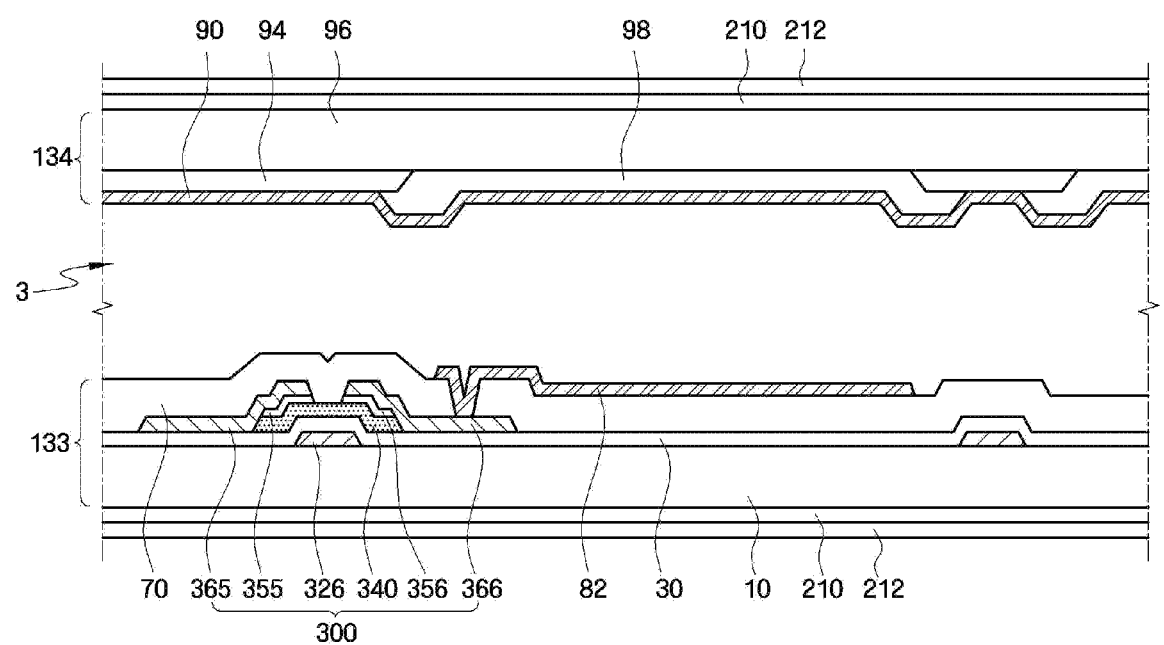
FIG. 2 is a sectional view of the liquid crystal display of FIG. 1 taken along line II-II' of FIG. 1.

Referring to FIG. 1 and FIG. 2, the LCD according to an exemplary embodiment of the present invention includes a first display panel 133, a second display panel 134 facing the first display panel 133, and a liquid crystal layer 3 disposed between the first display panel 133 and the second display panel 134. In addition, the LCD includes compensating films 210 and polarizing films 212 sequentially disposed on outer surfaces of the first display panel 133 and the second display panel 134.

The first display panel 133 includes a first substrate 10, a thin film transistor (TFT) 300 formed on the first substrate 10, a passivation layer 70 formed on the TFT 300, and a pixel electrode 82 connected to the TFT 300. Here, the first substrate 10 may be made of a transparent insulating material, such as glass.

The TFTs 300 are disposed at regions where gate lines 22, which are arranged in a row direction, and data lines 62, which are arranged in a column direction, cross each other, and they apply data signals supplied from the data lines 62 to a pixel electrode 82 according to gate signals applied to the gate lines 22. The TFT 300 includes a gate electrode 326, a gate insulating film 30, a semiconductor layer 340, ohmic contact layers 355 and 356, a source electrode 365, and a drain electrode 366.

The gate electrode 326 is formed on the first substrate 10 and is connected to the gate lines 22. The gate electrode 326 may be made of, for example, an aluminum (Al) based metal such as Al and Al alloy, a silver (Ag) based metal such as Ag or Ag alloy, a copper (Cu) based metal such as Cu or Cu alloy, a molybdenum (Mo) based metal such as Mo or Mo alloy, chromium (Cr), titanium (Ti), or tantalum (Ta).

The gate insulating film 30 is formed on the gate electrode 326 and the gate lines 22. The gate insulating film 30 may be made of silicon nitride ($SiN_x$) or silicon oxide ($SiO_x$).

The semiconductor layer 340, which may be made of a semiconductor material such as hydrogenated amorphous silicon, is disposed on the gate insulating layer 30. In the exemplary embodiment, the semiconductor layer 340 is formed in an island shape but the semiconductor layer 340 is not limited thereto. Rather, the semiconductor layer 340 may have any of various shapes such as an island shape or a stripe shape.

The ohmic contact layers 355 and 356 are disposed on the semiconductor layer 340 and reduce contact resistance between the semiconductor layer 340 and the source electrode 365 and between the semiconductor layer 340 and the drain electrode 366. The ohmic contact layers 355 and 356 may be made of silicide or n+ hydrogenated amorphous silicon heavily doped with silicide or n-type dopant.

The source electrode 365 and the drain electrode 366 are formed on the ohmic contact layers 355 and 356, and are connected to the data lines 62 and the pixel electrode 82, respectively. Here, at least a portion of the source electrode 365 may overlap the semiconductor layer 340, and the drain electrode 366 may be disposed opposite to the source electrode 365 with respect to the gate electrode 326 and at least a portion thereof overlaps the semiconductor layer 340.

The passivation layer 70 is formed over the first substrate 10 and the TFT 300. The passivation layer 70 may be made of an inorganic material such as silicon nitride or silicon oxide, a photosensitive organic material having a good flatness characteristic, or a low dielectric insulating material such as a-Si:C:O and a-Si:O:F formed by plasma enhanced chemical vapor deposition (PECVD).

The pixel electrode 82 is formed on the passivation layer 70, and provides data signals supplied from the data lines 62 according to gate signals to the liquid crystal layer 3. The pixel electrode 82 is connected to the drain electrode 366 through a contact hole formed in the passivation layer 70. Here, the pixel electrode 82 may be made of, for example, a transparent conductive material such as indium tin oxide (ITO) or indium zinc oxide (IZO), or a reflective conductive material such as aluminum (Al).

Alternatively, an alignment layer (not shown) to align the liquid crystal layer 3 may be formed on the pixel electrode 82.

The second display panel 134 is disposed to face first display panel 133 and includes a second substrate 96, a black matrix 94, color filters 98, and a common electrode 90. Here, the second substrate 96 may be made of a transparent insulating material such as glass, like the first substrate 10.

The black matrix 94 is disposed on the second substrate 96 and prevents light from being leaked. In detail, the black matrix 94 may be formed to partially cover the gate lines 22, the data lines 62, and the TFT 300 provided on the first display panel 133.

The color filters 98 are sequentially disposed on portions of the second substrate 96 and the black matrix 94 to correspond to each pixel electrode 82. For example, the color filters 98 may include red, green, and blue colors.

A common electrode 90 is formed on the color filters 98 and the black matrix 94, and the common electrode 90 and the pixel electrode 82 apply the voltages corresponding to the data signals to the liquid crystal layer 3. Here, the common electrode 90 may extend through multiple pixels.

An alignment layer (not shown) to align the liquid crystal layer 3 may also be formed on the common electrode 90.

The polarizing films 212 to polarize light are disposed on outer surfaces of the first display panel 133 and the second display panel 134, respectively. Here, the polarizing films 212 may be positioned such that the polarization axes or transmissive axes thereof are perpendicular to each other. Alternatively, the polarizing films 212 may be positioned such that at least one of the polarization axes thereof is at about 45° or 135° with respect to the rubbing direction of the alignment layer.

The compensating films 210 are sandwiched between the first display panel 133 and the polarizing film 212 or between the second display panel 134 and the polarizing film 212, and may improve the viewing angle of the LCD. The compensating films 210 may be liquid crystal polymer compensating films formed through hybrid-alignment of discotic liquid crystal molecules. For example, the compensating films 210 may be wide-view (WV) films, which are commercially available from Fuji Photo Film Co. Ltd., Japan.

The liquid crystal layer 3 is disposed between the first display panel 133 and the second display panel 134, and light transmittance is varied according to the voltage applied between the pixel electrode 82 and the common electrode 90.

The liquid crystal layer 3 according to exemplary embodiments of the present invention contains twisted nematic (TN) liquid crystal molecules 31 having positive dielectric anisotropy. A liquid crystal composition of the liquid crystal layer 3 includes a non-polar compound and a polar compound.

The non-polar compound includes a compound represented by chemical formula (I):

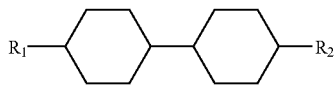

wherein each of R1 and R2 is an alkane, cycloalkane, or alkene. The non-polar compound may be present in an amount of about 25 to about 40 wt % relative to the weight of liquid crystal composition.

The polar compound may be contained in an amount of about 20 to about 60 wt % relative to the weight of liquid crystal composition.

In addition, the polar compound may include a first polar compound and a second polar compound represented by chemical formulas (II) and (III), respectively:

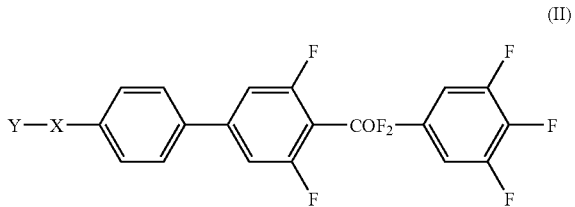

wherein X is

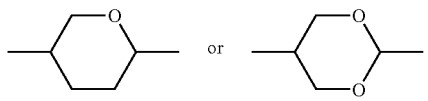

and Y is an alkane, cycloalkane, or hydrogen, and

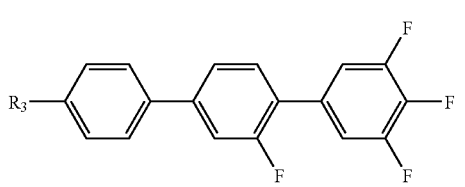

wherein $R_3$ is an alkane, cycloalkane, or alkene. Each of the first polar compound and the second polar compound may be present in an amount of less than 15 wt % relative to the weight of liquid crystal composition.

Figure 3:
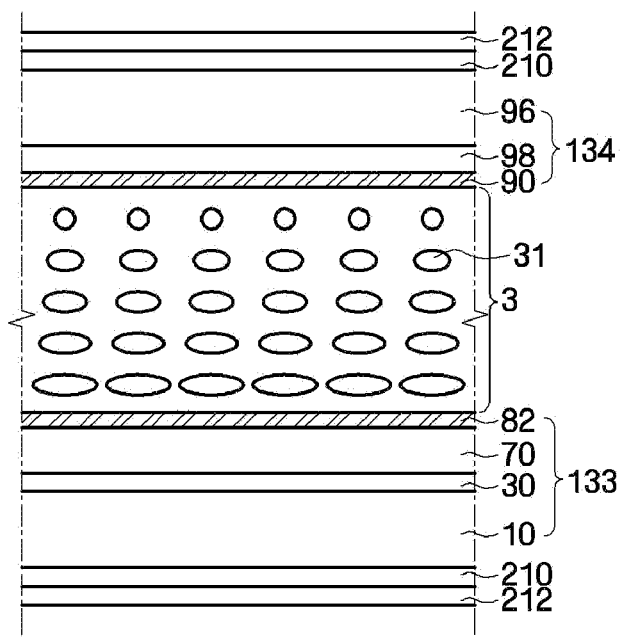
FIG. 3 and FIG. 4 are diagrams showing operating states of pixels in the liquid crystal display according to an exemplary embodiment of the present invention.
Figure 4:
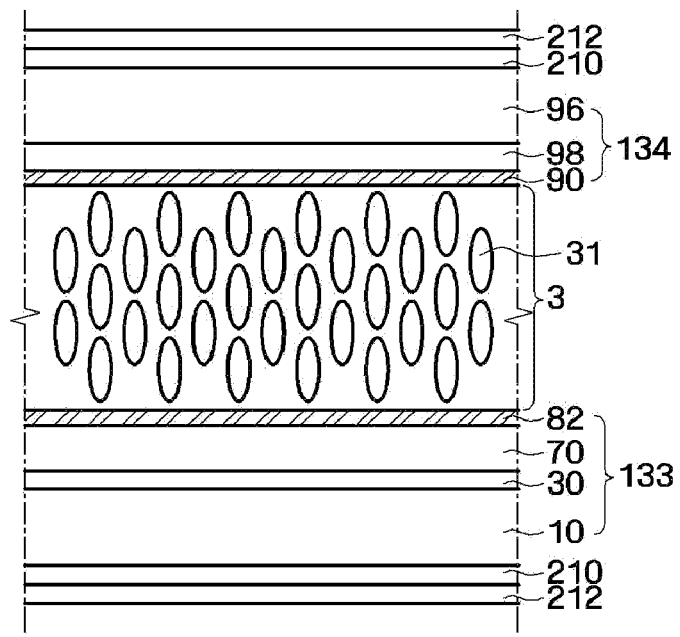

FIG. 3 and FIG. 4 are diagrams showing operating states of pixels in the liquid crystal display according to an exemplary embodiment.

Referring to FIG. 3, when no electric field is created in the liquid crystal layer 3 because there is an absence of a voltage difference between the pixel electrode 82 and the common electrode 90, long axes of the liquid crystal molecules 31 of the liquid crystal layer 3 are parallel to surfaces of the first display panel 133 and the second display panel 134. In addition the long axes of the respective liquid crystal molecules 31 are aligned spirally from the first display panel 133 to the second display panel 134.

When the polarization axes of the polarizing films 212 are perpendicular to each other, light transmitted through the liquid crystal layer 3 passes through the polarizing films 212 disposed above the second display panel 134, thereby implementing a bright state. Accordingly, the LCD can be driven in a normally white mode. On the other hand, when the polarization axes of the polarizing films 212 are parallel to each other, light transmitted through the liquid crystal layer 3 is blocked by the polarizing films 212 disposed above the second display panel 134, thereby implementing a dark state. Accordingly, the LCD can be driven in a normally black mode.

Referring to FIG. 4, an electric field can be created in the liquid crystal layer 3 due to a voltage difference between the pixel electrode 82 and the common electrode 90. The voltage difference corresponds to a data signal. In such a case, the long axes of the liquid crystal molecules 31 of the liquid crystal layer 3 are aligned to be perpendicular to surfaces of the first display panel 133 and the second display panel 134. Light transmitted through the polarizing films 212 disposed under the first display panel 133 can pass through the liquid crystal layer 3 without being polarized. Accordingly, in the normally white mode, light transmitted through the liquid crystal layer 3 is blocked by the polarizing films 212 disposed above the second display panel 134, thereby implementing a dark state. On the other hand, in the normally black mode, light transmitted through the polarizing films 212 disposed under the first display panel 133 passes through the polarizing films 212 disposed above the second display panel 134, thereby implementing a bright state.

The alignment direction of the TN mode liquid crystal molecules 31 may vary according to the presence or absence of electric field created between the first display panel 133 and the second display panel 134 with a voltage corresponding to the data signal applied thereto, that is, in an electric field direction or in the original alignment direction. Here, the time required for the liquid crystal molecules 31 to align in the electric field direction, i.e., a rising time ($\tau_r$), and a time taken for the liquid crystal molecules 31 to align in the original alignment direction, i.e., a falling time ($\tau_f$), are closely related to a response speed ($\tau_t$) of the liquid crystal molecules 31. In other words, the shorter the rising time ($\tau_r$) and the falling time ($\tau_f$) of the liquid crystal molecules 31, the higher the response speed ($\tau_t$) of the liquid crystal molecules 31.

The rising time ($\tau_r$) and the falling time ($\tau_f$) of the liquid crystal molecules 31 may be represented by Expressions (1) and (2):

$$\tau_r \propto \left(\frac{d}{\pi}\right)^2 \frac{\gamma_1}{K}\left(\frac{1}{(V/V_{th})^2 - 1}\right) \quad (1)$$

$$\tau_f \propto \frac{\gamma_1 d^2}{K\pi^2} \quad (2)$$

wherein d denotes a thickness of the liquid crystal layer 3, i.e., a cell gap, $\gamma_1$ denotes a rotational viscosity of the liquid crystal molecules 31, K denotes an elastic modulus, V denotes a driving voltage, that is, a voltage applied between the first display panel 133 and the second display panel 134, and $V_{th}$ denotes a threshold voltage, respectively.

As shown in Expressions (1) and (2), the rising time ($\tau_r$), the falling time ($\tau_f$) and the response speed ($\tau_t$) of the liquid crystal molecules 31 may be determined by liquid crystal properties, including the rotational viscosity ($\gamma_1$) and the elastic modulus (K) of the liquid crystal molecules 31, the driving voltage (V), the cell gap (d), and so on. For example, the response speed ($\tau_t$) of the liquid crystal molecules 31 may be increased by decreasing the rotational viscosity ($\gamma_1$) or by increasing the elastic modulus (K).

However, increasing the elastic modulus (K) of the liquid crystal molecules 31 may result in a change of another property, for example, the dielectric anisotropy ($\Delta\in$), or the threshold voltage ($V_{th}$), thereby degrading viewing angle and contrast ratio of the LCD. For example, as expressed in Equation (3):

$$V_{th} = \pi\sqrt{\frac{K}{\varepsilon_0 \Delta\varepsilon}} \quad (3)$$

$$= \pi\sqrt{\frac{K11 + (K33 - 2K22)/4}{\varepsilon_0 \Delta\varepsilon}}$$

wherein K22 is a twist elastic constant of the liquid crystal molecules 31, K11 is a splay elastic constant, K33 is a bend elastic constant, $\in_0$ is a dielectric constant of a free space, and $\Delta\in$ is a dielectric anisotropy, an increase in the elastic modulus (K) causes the threshold voltage ($V_{th}$) to increase, which may degrade the viewing angle and contrast ratio of the LCD in an intermediate gray area of the black and white areas.

In LCDs according to exemplary embodiments of the present invention, in order to improve the response speed of the LCD while preventing degradation of the viewing angle and the contrast ratio, the liquid crystal molecules 31 contained in the liquid crystal layer 3 may have a dielectric anisotropy ($\Delta\in$) in a range of about 4.5 to about 5.7. If the dielectric anisotropy ($\Delta\in$) is less than 4.5 or greater than 5.7, the viewing angle and the contrast ratio of the LCD may be deteriorated.

In more detail, when a voltage of 5.8 V or greater, for example, a voltage in a range of about 5.8V to about 10.0V, is applied to the first display panel 133 and the second display panel 134, so that the LCD is driven in a normally black or white mode, the dielectric anisotropy ($\Delta\in$) may be in a range of about 4.5 to 5.7. If a voltage of less than 5.8 V, for example, a voltage in a range of about 4.0 V to about 5.8 V, is applied to both sides of the first display panel 133 and the second display panel 134, so that the LCD is driven in a normally black or white mode, the dielectric anisotropy ($\Delta\in$) may be in a range of about 5.0 to about 5.7.

In addition, in order to improve the response speed ($\tau_t$) of the LCD while preventing degradation of the viewing angle and the contrast ratio, the liquid crystal molecules 31 contained in the liquid crystal layer 3 may have a relatively small splay elastic constant (K11), for example, about 14 pN or less, and more specifically in a range of about 10 pN to about 14 pN. Further, the liquid crystal molecules 31 contained in the liquid crystal layer 3 may have a relatively large bend elastic constant (K33), for example about 12 pN, and more specifically in a range of about 12 pN to about 15 pN. In other words, when the LCD according to the exemplary embodiment of the present invention has a relatively small K11 value, the rising time ($\tau_r$) may be reduced, thereby improving the response speed ($\tau_t$). In addition, when the LCD according to the exemplary embodiment of the present invention has a relatively small K33 value, the falling time ($\tau_f$) may be reduced, thereby improving the response speed ($\tau_t$), which will be described below in more detail through Examples that follow.

If K11 is greater than 14 pN, the response speed ($\tau_t$) of the liquid crystal molecules 31 may be reduced. If K11 is less than 10 pN, other physical properties of the liquid crystal molecules 31, such as the dielectric anisotropy ($\Delta\in$), may deteriorate, so that the LCD may not have the desired viewing angle, contrast ratio, and response speed ($\tau_t$). If K33 is less than 12 pN, the response speed ($\tau_t$) of the liquid crystal molecules 31 may be reduced. If K33 is greater than 15 pN, other physical properties of the liquid crystal molecules 31, such as the dielectric anisotropy ($\Delta\in$), may deteriorate, so that the LCD may not exhibit the desired viewing angle, contrast ratio, and response speed ($\tau_t$).

The liquid crystal layer 3 may have a cell gap in a range of about 2.5 μm to about 4.0 μm, and a birefringent anisotropy ($\Delta n$) in a range of about 0.1 to about 0.15. If the cell gap of the liquid crystal molecules 31 is greater than 4.0 μm, the response speed ($\tau_t$) may be reduced. If the cell gap of the liquid crystal molecules 31 is less than 2.5 μm, the viewing angle and the contrast ratio of the liquid crystal molecules 31 may deteriorate. In addition, if the birefringent anisotropy ($\Delta n$) is less than 0.1 or greater than 0.15, the LCD may not exhibit the desired viewing angle, contrast ratio, and response speed ($\tau_t$).

The liquid crystal molecules 3 may have a rotational viscosity ($\gamma_1$) in a range of about 40 mPa·s to about 60 mPa·s. If the rotational viscosity ($\gamma_1$) of the liquid crystal molecules 31 is less than 40 mPa·s, the response speed ($\tau_t$) may deteriorate. If the rotational viscosity ($\gamma_1$) of the liquid crystal molecules 31 is greater than 60 mPa·s, the viewing angle and the contrast ratio of the LCD may deteriorate.

Exemplary embodiments of the present invention will be described in detail through the following concrete experimental examples. These examples are given solely for the purpose of illustration and are not to be construed as limitations of the present invention, as many variations thereof are possible without departing from the spirit and scope of the invention.

Example 1

Response Speed

When applying a voltage of 6 V between a first display panel and a second display panel having a cell gap of about 3.0 μm, the rising time ($\tau_r$), the falling time ($\tau_f$), and the response speed ($\tau_t$) were measured using liquid crystal molecules having the physical properties listed in Table 1. A polar compound represented by chemical formulas (II):

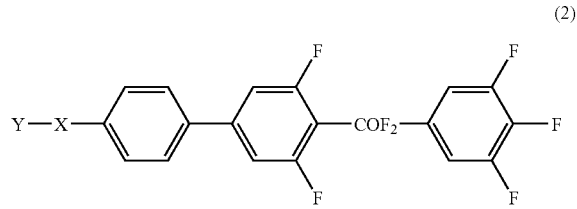

(2)

wherein X is

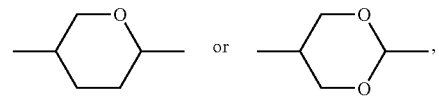

and Y is an alkane, cycloalkane, or hydrogen, was contained in the liquid crystal composition of Example 1, but not in the liquid crystal compositions of Comparative Examples 1-3. In Example 1, the polar compound was present in an amount of less than 15 wt % relative to the weight of liquid crystal composition.

Results of Example 1 and Comparative Examples 1-3 are summarized in Table 2.

TABLE 1

| Liquid crystal molecules | Viscosity [mPa·s] | Δε | K11[pN] | K33[pN] | K[pN] |
|---|---|---|---|---|---|
| Example 1 | 46 | 5.6 | 13.8 | 12 | 13.4 |
| Comparative Example 1 | 47 | 5.6 | 14.1 | 12.2 | 13.6 |
| Comparative Example 2 | 47 | 5.7 | 14.6 | 12.6 | 14.1 |
| Comparative Example 3 | 46 | 5.6 | 14.6 | 11.8 | 13.9 |

TABLE 2

| Liquid crystal molecules | $\tau_r$[ms] | $\tau_f$[ms] | $\tau_t$[ms] |
|---|---|---|---|
| Example 1 | 0.93 | 2.78 | 3.70 |
| Comparative Example 1 | 0.95 | 2.84 | 3.79 |
| Comparative Example 2 | 1.00 | 2.75 | 3.75 |
| Comparative Example 3 | 1.02 | 2.88 | 3.90 |

From Tables 1 and 2, it can be understood that the smaller the K11 value, the shorter the rising time ($\tau_r$), and the larger the K33 value, the shorter the falling time ($\tau_f$).

In more detail, the K11, K33, and rising time ($\tau_r$), and the K11, K33, and falling time ($\tau_f$), of the liquid crystal compositions used in Comparative Examples 1-3 and Example 1, were correlated with one another as expressed in Equations (4) and (5), respectively, which are obtained by regression analysis:

$$\tau_r = -0.258 + 0.109K11 - 0.0268K33 \quad (4)$$

$$\tau_f = 3.78 + 0.0577K11 - 0.145K33 \quad (5)$$

wherein the degrees of fitness of regression equations expressed in Equations (4) and (5) are about 99.4% and about 70.9%, respectively.

From Expressions 4 and 5, it can be understood that the rising time ($\tau_r$) is influenced by K11 about 4 times more heavily than by K33, and the falling time ($\tau_f$) is influenced about 2.6 times more heavily by K33 than by K11.

As in Example 1, when K11 is about 14 pN or less and K33 is about 12 pN or greater, the rising time ($\tau_r$) and falling time ($\tau_f$) are reduced, the overall response speed ($\tau_t$) may be improved. In contrast, in Comparative Example 1, K11 is greater than about 14 pN even if K33 is about 12 pN or greater, the response speed ($\tau_t$) is deteriorated. Also, in Comparative Example 3, when K33 is less than about 12 pN, the response speed ($\tau_t$) is deteriorated.

Example 2

Viewing Angle and Contrast Ratio

While applying a voltage of about 5.0 to 6.0 V between a first display panel and a second display panel having a cell gap of about 3.0 μm with liquid crystal molecules having a dielectric anisotropy in a range of 4.5 to 6.0 disposed between the first display panel and the second display panel, the contrast ratio and viewing angle of the liquid crystal molecules were measured.

The viewing angles in upward, downward, left, and right directions were measured by measuring angles of a location having a contrast ratio of 10:1 in a direction perpendicular to the first and second display panels. The viewing angle and contrast ratio were measured while varying voltages and dielectric anisotropies, and the measurement results are summarized in Table 3.

TABLE 3

| Dielectric anisotropy | Voltages (V) | CR | Viewing angle (Up/Down/Left/Right)(°) |
|---|---|---|---|
| 4.5 | 5.0 | 850:1 | 75/65/80/80 |
|  | 5.5 | 900:1 | 75/75/80/80 |
|  | 5.8 | 1000:1 | 80/80/80/80 |
|  | 6.0 | 1050:1 | 80/80/80/80 |
| 4.7 | 5.0 | 900:1 | 78/75/80/80 |
|  | 5.5 | 950:1 | 78/78/80/80 |
|  | 5.8 | 1000:1 | 80/80/80/80 |
|  | 6.0 | 1050:1 | 80/80/80/80 |
| 5.0 | 5.0 | 950:1 | 75/80/80/80 |
|  | 5.5 | 1000:1 | 80/80/80/80 |
|  | 5.8 | 1000:1 | 80/80/80/80 |
|  | 6.0 | 1000:1 | 80/80/80/80 |
| 5.3 | 5.0 | 980:1 | 80/80/80/80 |
|  | 5.5 | 1000:1 | 80/80/80/80 |
|  | 5.8 | 1000:1 | 80/80/80/80 |
|  | 6.0 | 1000:1 | 80/80/80/80 |
| 5.5 | 5.0 | 1050:1 | 80/80/80/80 |
|  | 5.5 | 1000:1 | 80/80/80/80 |
|  | 5.8 | 980:1 | 78/80/80/80 |
|  | 6.0 | 950:1 | 75/80/80/80 |
| 5.7 | 5.0 | 1000:1 | 80/80/80/80 |
|  | 5.5 | 950:1 | 80/80/80/80 |
|  | 5.8 | 900:1 | 75/80/80/80 |
|  | 6.0 | 870:1 | 70/80/80/80 |
| 6.0 | 5.0 | 950:1 | 75/80/80/80 |
|  | 5.5 | 900:1 | 70/80/80/80 |
|  | 5.8 | 850:1 | 68/80/80/80 |
|  | 6.0 | 800:1 | 65/80/80/80 |

From Table 3, it may be understood that when a voltage of about 5.8 to 6.0 V is applied to the first display panel and the second display panel with liquid crystal molecules having a dielectric anisotropy in a range of 4.5 to 5.3 disposed between the first display panel and the second display panel, the liquid crystal molecules exhibit high contrast ratios of not less than 1000:1 and wide viewing angles of about 80° in upward, downward, left, and right directions of the first and second display panels.

Meanwhile, when a voltage of less than 5.8 V, for example, 5.0 V or 5.5 V, is applied to the first display panel and the second display panel with liquid crystal molecules having a dielectric anisotropy in a range of 5.0 to 5.7 disposed between the first display panel and the second display panel, the liquid crystal molecules exhibit high contrast ratios of not less than 1000:1 and wide viewing angles of about 80° in upward, downward, left, and right directions of the first and second display panels.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display, comprising:
   a first display panel and a second display panel facing each other to create an electric field therebetween; and
   a liquid crystal layer disposed between the first display panel and the second display panel,
   wherein the liquid crystal layer comprises liquid crystal molecules having positive dielectric anisotropy,
   wherein the liquid crystal layer has a structure in which long axes of the liquid crystal molecules are aligned spirally from the first display panel to the second display panel when no electric field is created at the liquid crystal layer, and wherein the liquid crystal molecules have a dielectric anisotropy ($\Delta\epsilon$) in a range of 4.5 to 5.7, a splay elastic constant (K11) of 14 pN or less, and a bend elastic constant (K33) of 12 pN or greater.

2. The liquid crystal display of claim 1, wherein K11 is in a range of 10 pN to 14 pN.

3. The liquid crystal display of claim 1, wherein K33 is in a range of 12 pN to 15.

4. The liquid crystal display of claim 1, wherein K11 and K33 have the same value.

5. The liquid crystal display of claim 1, further comprising:
a first compensating film disposed on an outer surface of the first display panel; and
a second compensating film disposed on an outer surface of the second display panel.

6. The liquid crystal display of claim 1, wherein the dielectric anisotropy is in a range of 4.5 to 5.3 when a voltage of 5.8 V or greater is applied to the first display panel and the second display panel.

7. The liquid crystal display of claim 1, wherein the dielectric anisotropy is in a range of 5.0 to 5.7 when a voltage of less than 5.8 V is applied to the first display panel and the second display panel.

8. The liquid crystal display of claim 1, wherein the liquid crystal molecules have a rotational viscosity in a range of 40 mPa·s to 60 mPa·s.

9. The liquid crystal display of claim 1, wherein the liquid crystal molecules have a birefringent anisotropy in a range of 0.1 to 0.15 and the liquid crystal layer has a cell gap in a range of 2.5 μm to 4.0 μm.

10. The liquid crystal display of claim 1, wherein a liquid crystal composition of the liquid crystal layer comprises 25 to 40 wt % of a non-polar compound relative to the weight of liquid crystal composition, the non-polar compound represented by chemical formula (I):

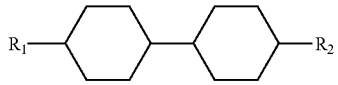

(I)

wherein each of $R_1$ and $R_2$ is an alkane, cycloalkane, or alkene.

11. The liquid crystal display of claim 1, wherein a polar compound is present at an amount of 20 to 60 wt % relative to the weight of liquid crystal composition.

12. The liquid crystal display of claim 11, wherein the polar compound comprises a first polar compound represented by chemical formula (II):

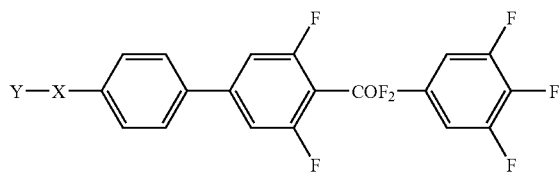

(II)

wherein X is

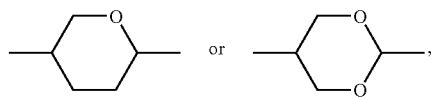

and Y is an alkane, cycloalkane, or hydrogen.

13. The liquid crystal display of claim 12, wherein the liquid crystal composition comprises 15 w % or less of the first polar compound and 15 w % or less of a second polar compound, the second polar compound represented by chemical formula (III):

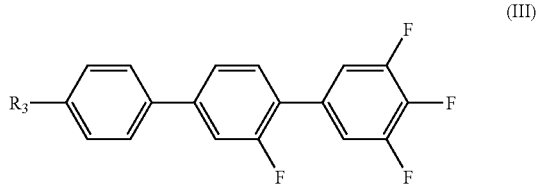

(III)

wherein $R_3$ is an alkane, cycloalkane, or alkene.

14. A liquid crystal composition, comprising:
a first polar compound containing liquid crystal molecules having a dielectric anisotropy ($\Delta\epsilon$) in a range of 4.5 to 5.7, a splay elastic constant (K11) of 14 pN or less, and a bend elastic constant (K33) of 12 pN or greater, the first polar compound being represented by chemical formula (II):

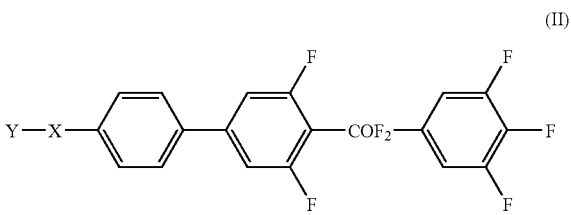

(II)

wherein X is

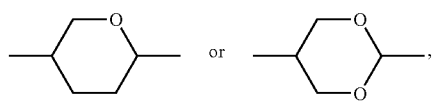

and Y is an alkane, cycloalkane, or hydrogen.

15. The liquid crystal composition of claim 14, wherein K11 is in a range of 10 pN to 14 pN.

16. The liquid crystal composition of claim 14, wherein K33 is in a range of 12 pN to 15 pN.

17. The liquid crystal composition of claim 14, further comprising a second polar compound represented by chemical formula (III):

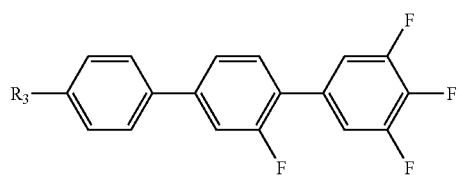
(III)

wherein $R_3$ is an alkane, cycloalkane, or alkene, and
wherein the first polar compound is present in an amount of 15 w % or less, and the second polar compound is present in an amount of 15 w % or less, relative to the weight of the liquid crystal composition.

18. The liquid crystal composition of claim 14, wherein the liquid crystal molecules are twisted nematic (TN) mode liquid crystal molecules.

* * * * *